United States Patent [19]

Isobe et al.

[11] Patent Number: 4,580,221

[45] Date of Patent: Apr. 1, 1986

[54] METHOD AND DEVICE FOR INTERNAL COMBUSTION ENGINE CONDITION SENSING AND FUEL INJECTION CONTROL

[75] Inventors: Toshiaki Isobe, Nagoya; Nobuyuki Kobayashi, Toyota, all of Japan

[73] Assignee: Toyota Jidosha Kabushiki Kaisha, Toyota, Japan

[21] Appl. No.: 438,347

[22] Filed: Nov. 1, 1982

[30] Foreign Application Priority Data

Jun. 24, 1982 [JP] Japan ................. 57-108924

[51] Int. Cl.$^4$ ............. F02M 51/00; F02B 3/12; F02D 5/02
[52] U.S. Cl. ............. 364/431.05; 123/480; 123/486; 364/431.11
[58] Field of Search ............. 364/431.07, 431.11, 364/431.12, 431.05; 123/416, 418, 480, 486

[56] References Cited

U.S. PATENT DOCUMENTS

| | | | |
|---|---|---|---|
| 4,163,282 | 7/1979 | Yamada et al. | 364/431.12 |
| 4,360,874 | 11/1982 | Ohba et al. | 364/431.12 X |
| 4,373,187 | 2/1983 | Ishii et al. | 364/431.06 |
| 4,389,996 | 6/1983 | Yaegashi et al. | 123/486 X |
| 4,421,085 | 12/1983 | Nagase et al. | 123/416 |
| 4,424,568 | 1/1984 | Nishimura et al. | 364/431.07 |
| 4,442,813 | 4/1984 | Nagase et al. | 123/418 |
| 4,450,528 | 5/1984 | Yaegashi et al. | 364/431.05 |
| 4,454,845 | 6/1984 | Takase | 123/416 |

Primary Examiner—Felix D. Gruber
Attorney, Agent, or Firm—Cushman, Darby & Cushman

[57] ABSTRACT

In a control method and device for a digitally controlled internal combustion engine, engine condition signals are read out from sensors for detecting conditions of the engine, with selected sensor outputs read out in synchronism with rotation of the engine at a predetermined crank angle empirically corresponding to a low engine load and resulting high battery voltage, the predetermined crank angle being within at least 20 crank angle degrees of bottom dead center.

7 Claims, 6 Drawing Figures

METHOD AND DEVICE FOR INTERNAL COMBUSTION ENGINE CONDITION SENSING AND FUEL INJECTION CONTROL

BACKGROUND OF THE INVENTION

1. Field of the Invention

This invention relates to a digital control method and device for an internal combustion engine and more particularly to improvements in a digital control method and device suitable for use in an engine of a motor vehicle having an electronic fuel injection device, wherein the engine is digitally controlled in response to engine condition signals that have been read out from sensors for detecting the conditions of the engine.

2. Description of the Prior Art

Heretofore, there has been put into practical use a digital control method for an internal combustion engine, wherein various sensors including a coolant temperature sensor, an intake air temperature sensor, an intake air pressure sensor, an intake air flow rate sensor, an engine rotation sensor and the like for detecting the conditions of the engine are provided on various portions of an internal combustion engine such as motor vehicle engine or the like, and fuel injection time of fuel injected into a combustion chamber of the engine, ignition timing, idle rotation speed and the like are digitally controlled in response to the engine condition signals including an engine coolant temperature, an intake air temperature, an intake air pressure, an intake air flow rate, a crank angle and the like which have been read out from the aforesaid sensors. In a digital control device for performing the aforesaid digital control, normally, an analogue signal from each sensor, for example, a coolant temperature sensor 10 for detecting an engine coolant temperature is, as shown in FIG. 1, converted into a digital signal by an Analogue-Digital Converter (hereinafter referred to as an "A/D converter") 14 in a digital control circuit 12, and thereupon, taken into a Central Processing Unit (hereinafter referred to as "CPU") 16 for performing various calculating operations. More specifically, a voltage from a battery 22 is applied to the aforesaid coolant temperature sensor 10 through a voltage regulator 18 having an output voltage Vc of 5 V, for example, and a resistor 20, whereby a change in voltage by a change in resistence of the coolant temperature sensor 10 due to a change in the engine coolant temperature is taken into the A/D converter 14 as an analogue signal indicating the engine coolant temperature.

The above-described digital control method features that the engine is accurately controllable. However, heretofore, a signal from each sensor, for example, a coolant temperature signal read out of an output from the coolant temperature sensor 10 has been taken in at a constant cycle of 1 or 2 seconds and converted into a digital signal in the A/D converter 14, without synchronizing with the rotation of the engine. Hence, for example, when a power supply voltage from the battery 22 drops greatly and the supply voltage Vc of the coolant temperature sensor 10 also drops during start and the like, an output voltage from the coolant temperature sensor 10 also drops. Thus, for example, when a thermistor type temperature sensor is used as the coolant temperature sensor 10, a temperature higher than the actual temperature is detected. As the result, there have been cases where too short fuel injecton time during start results in start failure, an insufficient increase after the start leads to unsatisfactory drivability, and, worst of all, an engine stall is caused.

SUMMARY OF THE INVENTION

The present invention has been developed to obviate the above-described disadvantages of the prior art, and has as its first object the provision of a digital control method for an internal combustion engine wherein accurate engine condition signals are obtainable regardless of a battery voltage drop, whereby the engine driving conditions during start and after the start are maintained properly, so that satisfactory start performance and drivability can be obtained.

The present inventiton has as its second object the provision of a digital control method for an internal combustion engine, capable of reading out outputs from sensors for detecting the conditions of the engine at a proper crank angle.

The present invention has as its third object the provision of a digital control method for an internal combustion engine, capable of obtaining accurate engine condition signals from outputs fed from a temperature sensor sensitive to the influence of a battery voltage drop.

The present invention has as its fourth object the provision of a digital control device for an internal combustion engine, capable of achieving the above-described objects.

To achieve the first object, according to the present invention, in a digital control method for an internal combustion engine, wherein the engine is digitally controlled in response to engine condition signals read out from sensor for detecting the engine conditions, the sensor outputs are read out in synchronism with the rotation of the engine at a crank angle where an engine load is low and a battery voltage is high, and turned into the engine condition signals.

To achieve the second object, according to the present invention, in a digital control method for an internal combustion engine, the crank angle for reading out the sensor outputs is made to be a crank angle very close to the bottom dead center.

To achieve the second object, according to the present invention, in a digital control method for an internal combustion engine, the crank angle for reading out the sensor outputs is made to be a crank angle within +20 degrees CA from the bottom dead center.

To achieve the third object, according to the present invention, in a digital control method for an internal combustion engine, the sensors are temperature sensors for detecting an engine coolant temperature, an intake air temperature and the like.

To achieve the fourth object, according to the present invention, the digital control device for an internal combustion engine comprises:

an intake air temperature sensor for detecting the temperature of the intake air taken in by an air cleaner;

a throttle sensor including an idle switch for detecting whether a throttle valve is within the range of idle opening or not and a potentiometer for generating a voltage output in proportion to an opening of the throttle valve;

an intake air pressure sensor for detecting an intake air pressure from pressure in a surge tank;

injectors for injecting fuel into the engine;

a top dead center sensor and a crank angle sensor for respectively outputting a top dead center signal and a crank angle signal in accordance with the rotation of the engine;

a coolant temperature sensor for sensing an engine coolant temperature; and a digital control circuit for extracting a basic injection time in accordance with the intake air pressure fed from the intake air pressure sensor and the engine rotational speed obtained from the crank angle signal fed from the crank angle sensor, and correcting the basic injection time in accordance with an output from the throttle sensor, the intake air temperature fed from the intake air temperature sensor and the engine coolant temperature fed from the coolant temperature sensor, both of which are read out at the crank angle close to the bottom dead center in synchronism with the rotation of the engine, and the like, so as to determine a fuel injection time and feed valve opening time signals to the injectors.

The present invention is based on the fact that the battery voltage is periodically varied in accordance with the engine load, and hence, even when the battery voltage drops, a relatively high battery voltage is generated at a crank angle where the engine load is low. According to the present invention, even when the battery voltage drops, accurate engine condition signals can be read in, and hence, the engine operating conditions during start and after the start can be maintained properly, thus enabling satisfactory start performance and drivability.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of an embodiment of the intake air pressure sensing type (D - J type) electronic fuel injection device for a motor vehicle engine, wherein the digital control method for an internal combustion engine according to the present invention is applied, with reference to the drawings.

Figure 1:
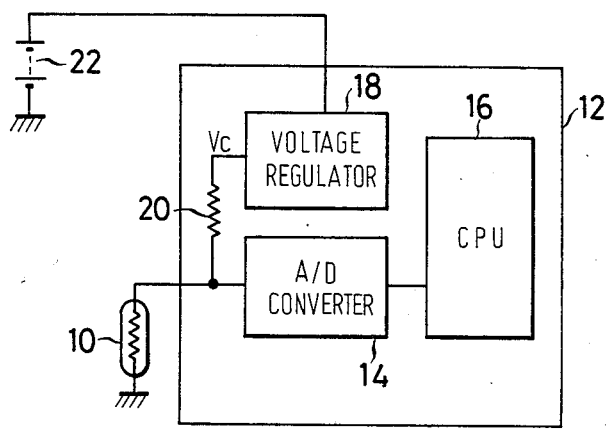
FIG. 1 is a block diagram showing an example of arrangement of a digital control circuit used in a digital control device for an engine of motor vehicle in the prior art.
Figure 2:
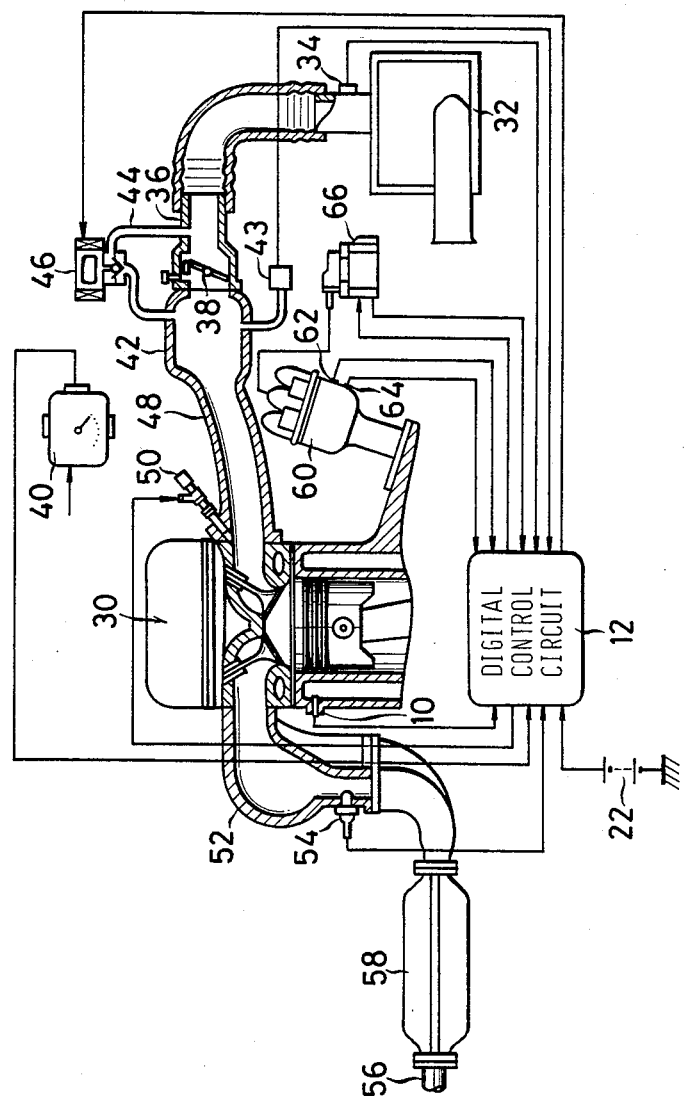
FIG. 2 is a sectional view, partially including a block diagram, showing the arrangement in an embodiment of the intake air pressure sensing type (so-called D - J type electronic fuel injection device for a motor vehicle engine, wherein the digital control method for an internal combustion engine according to the present invention is applied.

As shown in FIG. 2, the present embodiment is of such an arrangement that, in a D - J type electronic fuel injection device for a motor vehicle engine 30, comprising: an air cleaner 32 for taking in atmospheric air; an intake air temperature sensor 34 for detecting a temperature of the intake air taken in through the air cleaner 32; a throttle valve 38 provided on a throttle body 36 and openable in association with an accelerator pedal provided about a driver's seat, not shown, for controlling the flow rate of the intake air; a throttle sensor 40 including an idle switch for detecting whether the throttle valve 38 is within the range of idle opening or not and a potentiometer for generating an output voltage in proportion to the opening of the throttle valve 38; a surge tank 42 for preventing the intake air interference; an intake air pressure sensor 43 for detecting an intake air pressure from pressure in the surge tank 42; a bypass passage 44 bypassing the throttle valve 38; an idle speed control valve 46 provided in the intermediate portion of the bypass passage 44 for controlling an opening area of the bypass passage 44 to control idle rotation speed; injectors 50 provided on an intake manifold 48 for injecting fuel into intake ports of the engine 30; an oxygen concentration sensor (hereinafter referred to as an "O₂ sensor") 54 provided on an exhaust manifold 52 for detecting an air-fuel ratio from a residual oxygen concentration in the exhaust gas; a three-way catalytic converter 58 provided in the intermediate portion of an exhaust pipe 56 at the downstream side of the exhaust manifold 52; a distributor 60 having a distributor shaft rotatable in association with the rotation of a crankshaft of the engine 30; a top dead center sensor 62 and a crank angle sensor 64, both of which are incorporated in the distributor 60 for respectively outputting a top dead center signal and a crank angle signal in accordance with the rotation of the distributor shaft; a coolant temperature sensor 10 provided on an engine block for detecting an engine coolant temperature; and a digital control circuit 12 for extracting a basic injection time per one process of the engine in accordance with the intake air pressure fed from the intake air pressure sensor 43 and an engine rotational speed obtained from the crank angle signal fed from the crank angle sensor 64, correcting the basic injection time in accordance with the output from the throttle sensor 40, the air-fuel ratio fed from the O₂ sensor 54, the engine coolant temperature fed from the coolant temperature sensor 10, the voltage from the battery 22 and the like, so as to determine a fuel injection time and feed valve opening time signals to the injectors 50, determining an ignition timing in accordance with the engine operating conditions, feeding an ignition signal to a coil 66 with an igniter, and further, controlling the idle speed control valve 46 during idling, in the aforesaid digital control circuit 12, the outputs from the coolant temperature sensor 10 and the intake air temperature sensor 34 being read out at a crank angle very close to the bottom dead center in synchronism with the rotation of the engine.

Figure 3:
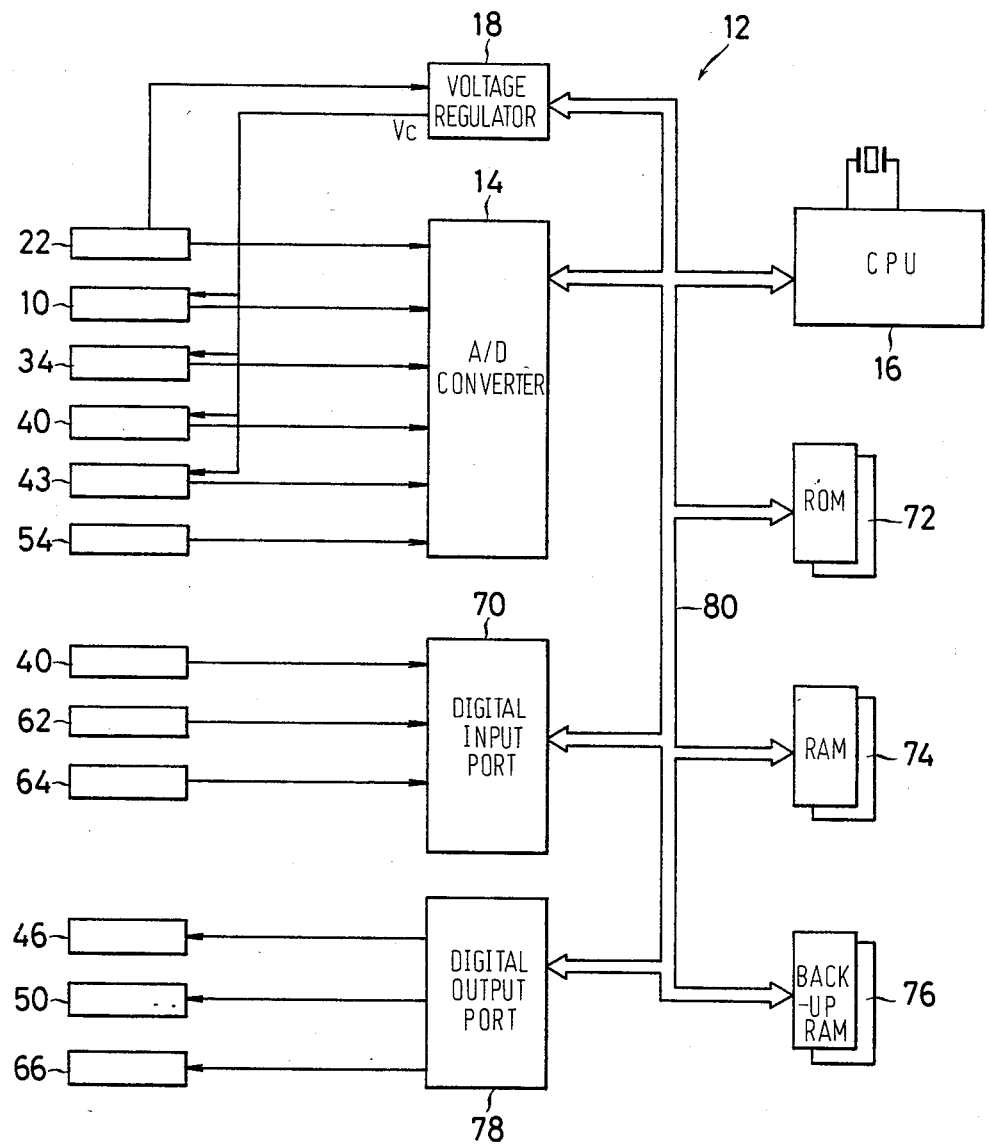
FIG. 3 is a block diagram showing the arrangement of the digital control circuit used in the aforesaid embodiment.

As shown in detail in FIG. 3, the digital control circuit 12 comprises: a Central Processing Unit (CPU) 16 such as a microprocessor for performing various calculating operations; an A/D converter 14 with a multiplexer for converting analogue signals fed from the battery 22, the coolant temperature sensor 10, the intake air temperature sensor 34, the potentiometer of the throttle sensor 40, the intake air pressure sensor 43, the O₂ sensor 54 and so forth into digital signals and taking the digital signals into the CPU 16 successively; a voltage regulator 18 for applying a constant voltage Vc to the coolant temperature sensor 10, the intake air temperature sensor 34, the potentiometer of the throttle sensor 40, the intake air pressure sensor 43 and so forth; a digital input port 70 for taking the digital signals fed from the idle switch of the throttle sensor 40, the top dead center sensor 62, the crank angle sensor 64 and so forth into the CPU 16 at predetermined timings; a Read Only Memory (hereinafter referred to as a "ROM") 72 for storing control programs, various constants and the like; a Random Access Memory (hereinafter referred to as a "RAM") 74 for temporarily storing calculation data and the like in the CPU 16; a backup Random Access Memory 76 supplied with voltage from an auxiliary power supply when the engine is out of operation for maintaining memory; a digital output port 78 for feeding the results of operation in the CPU 16 to the idle speed control valve 46, the injectors 50, the coil 66 with the igniter and so forth at predetermined timings; and a common bus 80 for connecting the above-described components to one another.

Description wil now be given of an exemplary best node.

Firstly, the digital control circuit 12 extracts the basic injection time TP in accordance with the intake air pressure PM fed from the intake air pressure sensor 43 and the engine rotational speed NE calculated from the crank angle signal fed from the crank angle sensor 64.

Further, the basic injection time TP is corrected in response to the signals fed from the various sensors through the following equation, whereby the fuel injection time TAU is calculated out.

$$TAU = TP * F \qquad (1)$$

where F indicates a correction factor. When F is larger than 1, an increase correction is meant, and when F is smaller than 1, a decrease correction is meant.

The valve opening time signals corresponding to the fuel injection time TAU thus determined are fed to the injectors 50, and the injectors are opened in synchronism with the rotation of the engine, whereby fuel is injected into the intake manifold 48 of the engine 30.

The following is the process of read-in of the output from the coolant temperature sensor 10 in the present embodiment.

Figure 4:
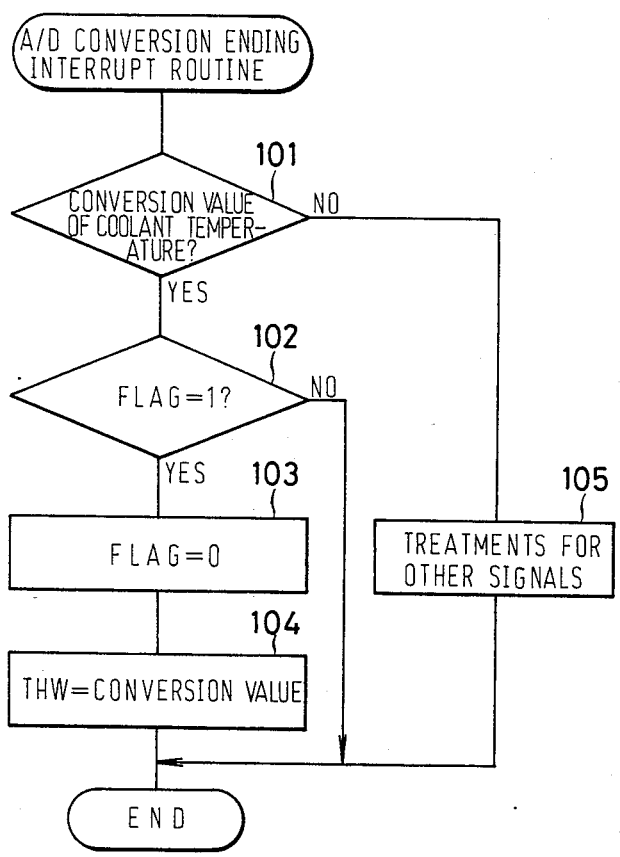
FIG. 4 is a flow chart showing a portion of an Analogue-Digital conversion ending interrupt routine used in the digital control circuit.

As shown in FIG. 4, in Step 101 of an Analogue-Digital conversion ending interrupt routine, it is determined whether the present conversion value is that of an engine coolant temperature or not. If this determination is positive, then the process goes forward to Step 102, where it is determined whether a signal read-in flag is set or not. If this flag is set, then the process goes forward to Step 103, where the signal read-in flag is rest (i.e., cleared) to zero. Then, the process goes forward to Step 104, where the present Analogue-Digital conversion value established as a read-in signal THW of the engine coolant temperature. Upon completion of Step 104, or when the determination in the aforesaid Step 102 is negative and not suitable for signal read-in, this program is terminated. On the other hand, when the determination of the aforesaid Step 101 is negative, the process goes forward to Step 105, where other signals such the intake air temperature are treated, to complete this program.

Figure 5:
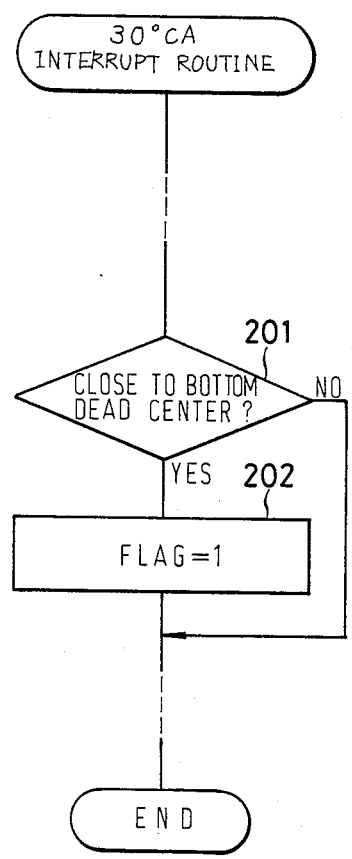
FIG. 5 is a flow chart showing a portion of a 30 degrees CA interrupt routine.

The signal read-in flag used in Step 102 of FIG. 4 is set by a 30° CA interrupt routine as shown in FIG. 5.

More specifically, in Step 201 of the 30° CA interrupt routine, it is determined whether a crank angle suitable for signal read-in, i.e., the bottom dead center, is obtained or not. That is, in the case of a six-cylinder engine, it is determined whether interruption is to be made at 60°, 120° or 300° after the top dead center or not. In the case of a four-cylinder engine, it is determined whether the interruption is to be made at 60° and 240° or 90° and 270° after the top dead center or not. If this step 201 determination is positive, the process goes forward to Step 202, where the signal read-in flag tested in step 102 is set. Upon is ending of Step 202, or when the determintion of Step 201 is negative, the process goes forward to the succeeding Step of the 30° CA interrupt routine.

Figure 6:
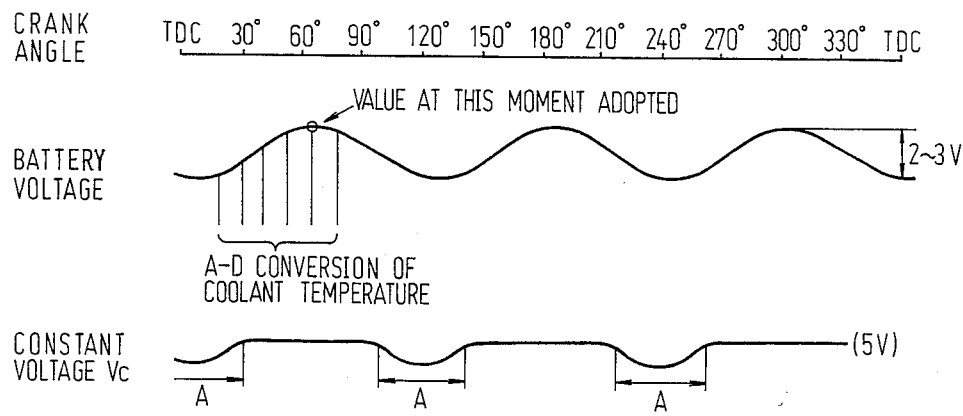
FIG. 6 is a diagram showing an example of the relations between the crank angle, battery voltage and the output voltage from the voltage regulator in the aforesaid embodiment.

As described hereinabove, the sensor outputs are read in at a crank angle synchronized with the engine rotation, as shown in FIG. 6, where the voltage regulator 18 functions satisfactorily to allow to obtain a stable constant voltage Vc, so that Analogue-Digital conversion values of an accurate engine coolant temperature and the intake air temperature can be obtained. In contrast thereto, heretofore, even in a section A shown in FIG. 6, wherein the constant voltage Vc drops, read-in of the engine coolant temperature and the like has been performed, thus presenting the disadvantages.

In the above-described embodiment, read-in of the engine coolant temperature is performed at a crank angle very close to the bottom dead center, however, the crank angle for read-in need not be limited to this, but it is possible to perform read-in at a crank angle within ±20° in the proximity of the bottom dead center in addition to the above.

In the above-described embodiment, the present invention is applied to read-in of the engine coolant temperature fed from the coolant temperature sensor and the engine intake air temperature fed from the intake air temperature sensor, however, the scope of application of the present invention need not be limited to this, but the present invention is applicable to read-in of outputs fed from sensors other than the above.

In the above-described embodiment, the present invention is applied to the motor vehicle engine having the D - J type electronic fuel injection device, however, the scope of application of the present invention need not be limited to this, but it is apparent that the present invention is also applicable to the motor vehicle engine having an intake air flow sensing type (so-called L - J type) electronic fuel injection device, or to the digital control device for the general internal combustion engine.

It should be apparent to those skilled in the art that the above-described embodiment is merely representative, and only represents applications of the principles of the present invention. Numerous and varied other arrangements can be readily devised by those skilled in the art without departing from the spirit and the scope of the invention.

What is claimed is:

1. A control device for an internal combustion engine, comprising:
   an intake air temperature sensor for detecting the temperature of intake air taken into said engine;
   a throttle sensor having an idle switch for detecting whether a throttle valve of said engine is within an idle opening range, and having a potentiometer for generating a voltage output in proportion to an opening of said throttle valve;

an intake air pressure sensor for detecting intake air pressure corresponding to pressure in a surge tank of said engine;

injectors for controllably injecting fuel into said engine;

a top dead center sensor and a crank angle sensor for respectively outputting a top dead center signal and a crank angle signal in accordance with distributor shaft rotation of said engine;

a coolant temperature sensor for sensing engine coolant temperature; and a digital control circuit for determining a basic fuel injection time in accordance with intake air pressure detected by said intake air pressure sensor and engine rotational speed said control circuit determines based on said crank angle sensor signal, for correcting said basic fuel injection time in accordance with said throttle sensor voltage output, intake air temperature detected by said intake air temperature sensor and engine coolant temperature detected by said coolant temperature sensor, for reading said engine coolant temperature at a substantially bottom dead center crank angle in accordance with distributor shaft rotation of said engine, and for using said corrected basic fuel injection time to determine fuel injection time for injection control of said injectors.

2. A control device as in claim 1, wherein said digital control circuit comprises:

a central processing unit including a microprocessor programmed to perform the recited functions of said digital control circuit;

an analogue input port with a multiplexer for converting analogue signals from said intake air temperature sensor, said throttle sensor voltage outputs, said intake air pressure sensor and said coolant temperature sensor into digital signals and successively passing said digital signals into said control processing unit;

a digital input port for receiving digital signals from said idle switch of said throttle sensor, said top dead center sensor and said crank angle sensor and passing them to said central processing unit at predetermined timings;

a read only memory for storing control programs and constants for said microprocessor;

a random access memory for temporarily storing calculation data of said central processing unit;

a backup random access memory, supplied with voltage from an auxiliary power supply when said engine is out of operation, for maintaining memory;

a digital output port for outputting results of operation of said central processing unit to said injectors at predetermined timings; and a common bus for connecting the recited components of said digital control circuit to one another.

3. A method for generating an engine condition signal from sensors sensing respective engine conditions, comprising the steps of:

detecting a predetermined crank angle of said engine;

reading an output from one of said sensors upon detection of said predetermined crank angle in synchronism with rotation of said engine; and establishing said output as an engine condition signal, wherein said predetermined crank angle corresponds to a period of relatively low engine load and resulting relatively high battery voltage.

4. A control method as in claim 3, wherein said one sensor is a temperature sensor for detecting an intake air temperature of said engine.

5. A control method as in claim 3, wherein said predetermined crank angle is substantially bottom dead center.

6. A control method as in claim 3, wherein said predetermined crank angle is a crank angle within ±20 degrees crank angle from bottom dead center.

7. A control method as in claim 3, wherein said one sensor is a temperature sensor for detecting engine coolant temperature.

* * * * *